(12) United States Patent
Piacenza et al.

(10) Patent No.: US 8,596,152 B2
(45) Date of Patent: Dec. 3, 2013

(54) ROTARY DRUM FOR A GEAR CONTROL DEVICE FOR A MOTOR-VEHICLE GEARBOX AND A GEAR CONTROL DEVICE FOR A MOTOR-VEHICLE GEARBOX HAVING SUCH A DRUM

(75) Inventors: Gianni Piacenza, Orbassano (IT);
Valter Pastorello, Orbassano (IT);
Gianluigi Pregnolato, Orbassano (IT);
Marco Garabello, Orbassano (IT);
Andrea Piazza, Orbassano (IT)

(73) Assignee: C.R.F. Societa' Consortile per Azioni, Turin (IT)

( * ) Notice: Subject to any disclaimer, the term of this patent is extended or adjusted under 35 U.S.C. 154(b) by 191 days.

(21) Appl. No.: 12/947,332

(22) Filed: Nov. 16, 2010

(65) Prior Publication Data
US 2011/0296934 A1 Dec. 8, 2011

(30) Foreign Application Priority Data
Jun. 3, 2010 (EP) ..................................... 10425188

(51) Int. Cl.
*F16H 59/00* (2006.01)
*F16H 61/00* (2006.01)
*F16H 63/00* (2006.01)
*F16H 25/08* (2006.01)
*F16H 25/16* (2006.01)

(52) U.S. Cl.
USPC ............................................. 74/55; 74/337.5

(58) Field of Classification Search
USPC ............. 74/55, 337.5, 473.1, 473.24, 473.25, 74/473.27, 473.29
See application file for complete search history.

(56) References Cited

U.S. PATENT DOCUMENTS

| 4,574,652 A | 3/1986 | Shichinohe et al. |
| 5,724,856 A * | 3/1998 | Back ............................... 74/335 |

(Continued)

FOREIGN PATENT DOCUMENTS

| DE | 12 02 665 B | 10/1965 |
| EP | 1 182 376 A2 | 2/2002 |

(Continued)

OTHER PUBLICATIONS

European Search Report Application No. EP 10 42 5188, dated Sep. 29, 2010.
Office Action issued by the European Patent Office in Application No. 11 190 035.3 dated Oct. 23, 2012.

*Primary Examiner* — David M Fenstermacher
*Assistant Examiner* — Jake Cook
(74) *Attorney, Agent, or Firm* — Venable LLP; Robert S. Babayi

(57) ABSTRACT

A rotary drum for a gear control device for a motor-vehicle gearbox is provided. The drum is rotatable about a rotation axis and includes two guide channels on a cylindrical lateral surface of the drum arranged to guide in a slidable manner at least one follower member. The rotary movement of the drum about the rotation axis is converted into translatory movement of said at least one follower member. A series of positioning notches are provided on the cylindrical lateral surface of the drum and spaced apart angularly along a circumference of the drum for snap-engagement by a stop member associated with the drum. The positioning notches are axially interposed between the two guide channels. Two rings of radial through-holes are provided on the cylindrical lateral surface of the drum, each axially interposed between the positioning notches and a respective guide channel.

6 Claims, 2 Drawing Sheets

(56) References Cited

U.S. PATENT DOCUMENTS

| | | | |
|---|---|---|---|
| 5,966,990 A * | 10/1999 | Fuchs et al. | 74/337.5 |
| 7,467,564 B2 * | 12/2008 | Baldwin et al. | 74/337.5 |
| 2001/0017063 A1 * | 8/2001 | Wildeshaus et al. | 74/473.29 |
| 2006/0162487 A1 * | 7/2006 | Chappelear et al. | 74/567 |
| 2007/0209460 A1 * | 9/2007 | Baldwin et al. | 74/335 |
| 2008/0081725 A1 | 4/2008 | Sotani et al. | |

FOREIGN PATENT DOCUMENTS

| | | |
|---|---|---|
| EP | 1 286 088-1 | 2/2003 |
| GB | 775 728 A | 5/1957 |
| GB | 2330885 A | 5/1999 |

* cited by examiner

ROTARY DRUM FOR A GEAR CONTROL DEVICE FOR A MOTOR-VEHICLE GEARBOX AND A GEAR CONTROL DEVICE FOR A MOTOR-VEHICLE GEARBOX HAVING SUCH A DRUM

CROSS-REFERENCE TO RELATED APPLICATION

This application claims the priority benefit of European Patent Application No. EP 10425188.9 filed on Jun. 3, 2010, the entirety of which is hereby incorporated by reference.

BACKGROUND OF THE INVENTION

1. Field of Invention

The present invention relates in general to a gear control device for a motor-vehicle gearbox, comprising:

- a drum which is associated with a shaft of the gearbox to bring about the movement of one or more engagement sleeves arranged slidably on the shaft, the drum being mounted so as to be rotatable about a rotation axis and having one or more guide channels in which one or more pegs, each associated with a respective engagement sleeve, engage slidably in such a manner that the rotary movement of the drum about its own axis is converted into translatory movement of the peg (or pegs) and hence of the engagement sleeve (or sleeves), and
- an actuation unit which is arranged to bring about the stepwise rotation of the drum about its own rotation axis between a plurality of angular positions each corresponding to predetermined positions of the engagement sleeve (or sleeves).

In a gear control device of this type, it is necessary to ensure that, once a given gear ratio is engaged, and hence once the drum has moved to a given angular position, the position of the engagement sleeves corresponding to the engagement of that given gear ratio is kept unchanged until the next gear shift, without the risk of vibrations or other mechanical disturbances modifying the position of the engagement sleeves and consequently causing damage to the gearbox.

2. Related Art

U.S. Pat. No. 4,574,652 discloses a drum for a gear control device for a motor-vehicle gearbox, the drum having, on its cylindrical lateral surface, two guide channels in each of which at least one follower member is slidably guided, whereby the rotary movement of the drum about its rotation axis is converted into translatory movement of the follower member(s), wherein a series of positioning notches are provided on the cylindrical lateral surface of the drum and are spaced apart angularly along a circumference of the drum for snap-engagement by a stop member associated with the drum, and wherein the positioning notches are axially interposed between the two guide channels.

EP 1 286 088 discloses a drum for a gear control device for a motor-vehicle gearbox, the drum having, on its cylindrical lateral surface, two guide channels in each of which a follower member is slidably guided. A ring is mounted at an end of the drum, coaxially with the same, and has a series of positioning notches which are spaced apart angularly for snap-engagement by a stop member.

DE 1 202 665 discloses a drum for a gear control device for a motorcycle gearbox, the drum having, on its cylindrical lateral surface, two guide channels in each of which a follower member is slidably guided, as well as a series of positioning holes which are spaced apart angularly for snap-engagement by a stop member carried by one of the shift forks of the gear control device and are axially interposed between the two guide channels. The positioning holes are not arranged along a circumference of the drum, but along a line extending parallel to the path of the guide channel associated to the above-mentioned shift fork.

US2006/162487 discloses a drum for a gear control device for a motorcycle gearbox comprising two drum portions which are fixedly connected for rotation with each other and have each, on the cylindrical lateral surface thereof, at least one guide channel in which a follower member is slidably guided. A detent plate is mounted at an end of the drum, coaxially with the same, and has a series of positioning notches which are spaced apart angularly for snap-engagement by a stop member.

SUMMARY OF THE INVENTION

It is an object of the present invention to provide a drum for a gear shift control device for a motor-vehicle gearbox of the type defined above, which is lighter and has smaller axial sizes than the art discussed above.

According to an embodiment of the present invention, a drum for a gear control device for a motor-vehicle gearbox of the type defined above is provided, wherein two rings of radial through-holes are provided on the cylindrical lateral surface of the drum and are each axially interposed (where the term "axial" will refer hereinafter to the direction of the rotation axis of the drum or a direction parallel thereto) between the positioning notches and a respective guide channel.

According to an embodiment of the invention, a rotary drum for a gear control device for a motor-vehicle gearbox is provided. The drum is rotatable about a rotation axis and includes two guide channels on a cylindrical lateral surface of the drum arranged to guide in slidable manner at least one follower member. The rotary movement of the drum about the rotation axis is converted into translatory movement of said at least one follower member. A series of positioning notches are provided on the cylindrical lateral surface of the drum and spaced apart angularly along a circumference of the drum for snap-engagement by a stop member associated with the drum. The positioning notches are axially interposed between the two guide channels. Two rings of radial through-holes are provided on the cylindrical lateral surface of the drum, each axially interposed between the positioning notches and a respective guide channel.

According to another embodiment, a gear control device for a motor-vehicle gearbox is provided. The gear control device includes first and second drums rotatably mounted about respective first and second rotation axes not coincident with each other. The gear control device includes an actuation unit arranged to bring about rotation of the first and second drums in a synchronized manner about the respective rotation axes, and a stop member associated with the first drum. Each of the drums has, on a cylindrical lateral surface thereof, at least one guide channel arranged to guide in slidable manner at least one follower member. Rotary movement of said first drum about the first rotation axis is converted into translatory movement of said at least one follower member. A series of positioning notches are provided on the cylindrical lateral surface of the first drum and are spaced apart angularly along a circumference of said first drum for snap-engagement by the stop member.

BRIEF DESCRIPTION OF THE DRAWINGS

Further features and advantages of the present invention will become clear from the following detailed description, given purely by way of non-limiting example with reference to the appended drawings, in which.

DETAILED DESCRIPTION

Embodiments of the invention are described and illustrated herein with reference to the use of a double-drum sequential gear control device for a motor-vehicle gearbox but, naturally, it is equally applicable to any drum gear control device, irrespective of whether the device is of the sequential or non-sequential type and irrespective of the number of drums forming part of the device.

Figure 1:
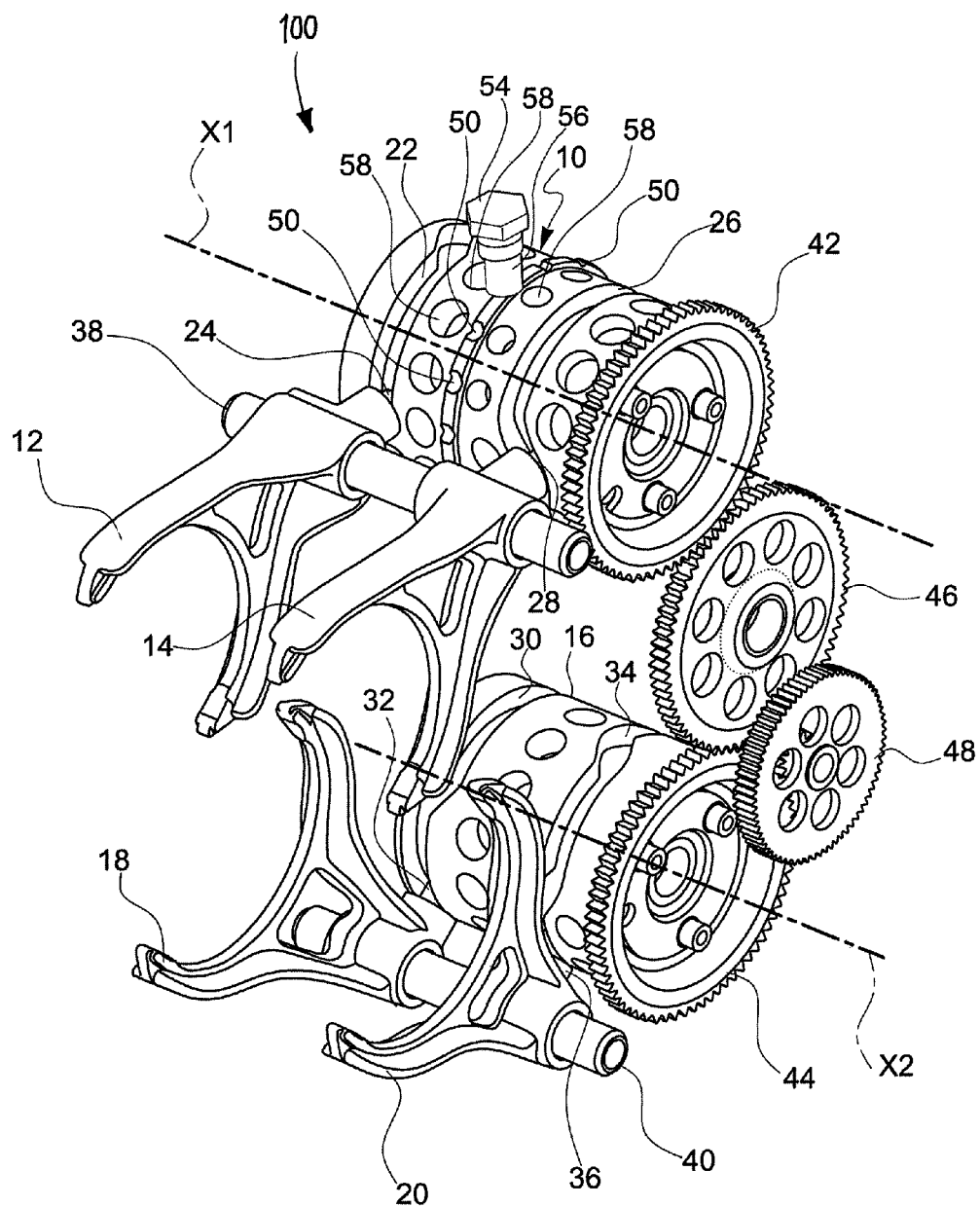
FIG. 1 is a perspective view of a drum for a gear control device for a motor-vehicle gearbox according to an embodiment of the present invention.

With reference initially to the embodiment depicted in FIG. 1, a gear control device for a motor-vehicle gearbox is generally indicated 100 and comprises basically:

a first drum 10 rotatably mounted about a first rotation axis X1 which coincides with the geometrical axis of the drum and is arranged parallel to the axes of the gearbox shafts;

a first pair of shift forks 12 and 14 slidably mounted along an axis parallel to the rotation axis X1 under the control of the first drum 10 in order to bring about the movement of one or more engagement sleeves (not shown) slidably mounted on a first shaft (likewise not shown) of the gearbox, between respective neutral and engagement positions;

a second drum 16 rotatably mounted about a second rotation axis X2 which coincides with the geometrical axis of the drum and is arranged parallel to but not coincident with the first rotation axis X1;

a second pair of shift forks 18 and 20 slidably mounted along an axis parallel to the rotation axis X2 (and hence also to the rotation axis X1) under the control of the second drum 16 to bring about the movement of one or more engagement sleeves (not shown) slidably mounted on a second shaft (likewise not shown) of the gearbox, between respective neutral and engagement positions; and an actuation unit (shown only partially) arranged to bring about rotation of the two drums 10 and 16.

In order to convert the rotary movements of the two drums about the respective rotation axes into translatory movements of the respective pairs of shift forks, the shift forks are connected for translation axially with respective pegs (or other follower members) which slidably engage in respective guide channels provided on the outer cylindrical surfaces of the drums. More specifically, the lateral surface of the first drum 10 is provided with a first guide channel 22 slidably engaged by a first peg 24 which is connected for translation axially with the shift fork 12, and a second guide channel 26 slidably engaged by a second peg 28 which is connected for translation axially with the shift fork 14, and the lateral surface of the second drum 16 is provided with a first guide channel 30 slidably engaged by a first peg 32 which is connected for translation axially with the shift fork 18, and a second guide channel 34 slidably engaged by a second peg 36 which is connected for translation axially with the shift fork 20. The shift forks 12 and 14 controlled by the first drum 10 are slidably mounted along a stationary rod 38 supported by the housing (not shown) of the gearbox, but they could also be mounted so as to be fixed for translation with an axially slidable rod. Similarly, the shift forks 18 and 20 controlled by the second drum 16 are slidably mounted along a stationary rod 40 supported by the housing, but they could also be mounted so as to be fixed for translation with an axially slidable rod.

The actuation unit comprises, basically, a motor (not shown), for example an electric motor, and a geared transmission mechanism which is arranged to transmit the rotary movement produced by the motor to the two drums and to synchronize the rotary movements of the two drums. More specifically, the geared transmission mechanism comprises a first gear 42 which is arranged coaxially with the first drum 10 and is connected thereto so as to be fixed for rotation therewith, a second gear 44 which is arranged coaxially with the second drum 16 and is connected thereto so as to be fixed for rotation therewith, a third gear 46 (hereinafter referred to as the intermediate gear) permanently meshing with both of the gears 42 and 44, and a pinion (not shown) carried by an output shaft of the motor (likewise not shown). The pinion meshes indirectly with one of the two gears 42 and 44 (in the present case with the gear 44) through a reduction gear 48 constituted for example by a double gear, but could also mesh directly with the gear 44 (or 42). The rotary movement imparted to the pinion by the motor is thus transmitted to the gear 44 of the second drum 16 and, through the intermediate gear 46, to the gear 42 of the first drum 10. The two drums 10 and 16 thus rotate in synchronized manner, in the sense that a given angular position of the motor, and hence of the pinion, corresponds to a given angular position of each of the two drums, and hence to a given position of each of the engagement sleeves. Naturally, in a non-sequential gear control device, the actuation unit will comprise a pair of motors each arranged to rotate a respective drum and, in this case, the position of each engagement sleeve will therefore depend on the angular position of the respective drum, that is to say, on the angular position of the respective motor.

Figure 2:
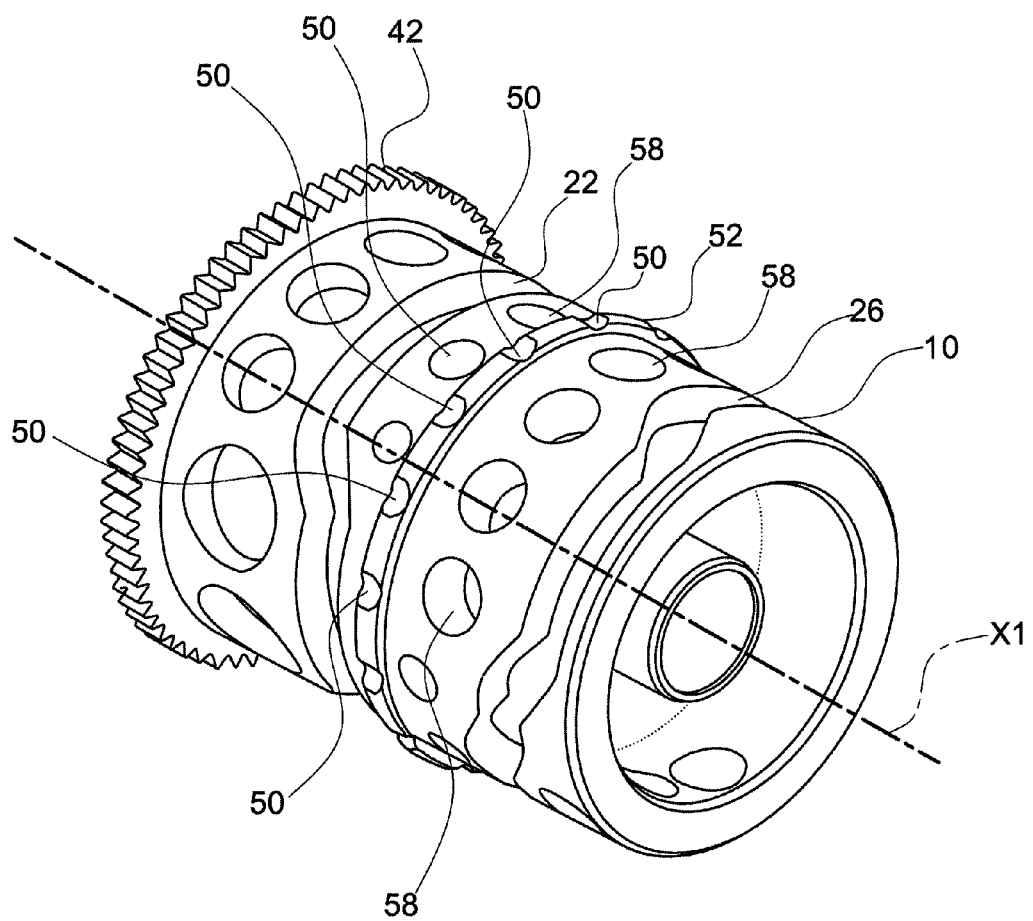
FIG. 2 is a perspective view of a gear control device for a motor-vehicle gearbox comprising two drums, one of which is of the type shown in FIG. 1.

With reference now also to FIG. 2, in order to ensure that the engagement sleeves are held in position between one gear shift and the next irrespective of the presence of mechanical disturbances such as, for example, vibrations, the first drum 10 has a series of positioning notches 50 which are arranged a predetermined angular distance apart along a circumference of the drum, which circumference extends in a plane perpendicular to the axis of the drum. In the embodiment illustrated, the positioning notches 50 are spaced at regular angular intervals but they could also be arranged at angular intervals that differ from one another. Naturally, each positioning notch 50 corresponds to a given angular position of the first drum 10 and hence to a given position of each of the engagement sleeves controlled by the shift forks 12, 14, 18 and 20 of the gear control device. The positioning notches 50 are formed in an annular track 52 projecting radially from the lateral surface of the first drum 10. The positioning notches 50 are intended to be snap-engaged by a stop member 54 which is formed, in the embodiment illustrated, as a detent pin. More precisely, the stop member 54 comprises a spherical pin 56 arranged radially relative to the first drum 10 and resilient means (not shown) acting on the spherical pin 56 so as to keep it urged against the annular track 52. Naturally, the stop member 54 will be positioned, relative to the first drum 10, in such a manner as to be aligned every time with one of the positioning notches 50 when the drum is in an angular position corresponding to a stable engagement condition, that is to say, a condition in which all of the engagement sleeves are in the neutral position or in which one of the engagement sleeves is in the engagement position (or two engagement sleeves are in the engagement position in case of a gear control device applied to a double-clutch gearbox). When the first drum 10 is in an angular position corresponding to a stable engagement condition, the spherical pin 56 of the stop member 54 thus engages (and is kept in engagement by the respective resilient means) in one of the positioning notches 50, thereby preventing the drum from rotating and moving away from the said angular position as a result of mechanical disturbances such as, for example, vibrations. When the first drum 10 is rotated by the motor of the actuation unit, on the other hand, the spherical pin 56 of the stop member 54 disengages from the previous positioning notch 50 and slides along the annular track 52 until it engages in a new positioning notch 50 corresponding to a new angular position of the drum, that is, to a new stable engagement condition.

In the embodiment illustrated, in which the gear control device is of the sequential type, it suffices for only one of the two drums to have the positioning notches, since the angular positions of the two drums are univocally linked to one another. When the invention is applied to a non-sequential gear control device, on the other hand, the positioning notches will of course be provided on both drums, since these latter are controlled by the respective motors independently of one another.

If the drum has two guide channels, the positioning notches are preferably axially interposed between the guide channels, as clearly shown in the drawings.

Moreover, the drum preferably has, on its lateral surface, a plurality of radial through-holes 58 having a weight-reducing function. If the drum has two guide channels, two rings of radial through-holes are advantageously provided and are each axially interposed between the positioning notches and a respective guide channel.

Naturally, the principle of the invention remaining unchanged, the embodiments and details of construction may be varied widely with respect to those described and illustrated purely by way of non-limiting example.

What is claimed is:

1. A drum for a gear control device for a motor-vehicle gearbox, the drum being rotatable about a rotation axis and comprising:
   two guide channels on a cylindrical lateral surface of the drum arranged to guide in a slidable manner at least one follower member, whereby the rotary movement of the drum about the rotation axis is converted into translatory movement of said at least one follower member;
   a series of positioning notches provided on the cylindrical lateral surface of the drum and spaced apart angularly along a circumference of the drum for snap-engagement by a stop member associated with the drum, and wherein the positioning notches are axially interposed between the two guide channels; and
   two rings of radial through-holes each axially interposed on the cylindrical lateral surface of the drum between the positioning notches and a respective guide channel.

2. The drum according to claim 1, wherein the positioning notches are formed in an annular track projecting radially from the cylindrical lateral surface of the drum.

3. The drum according to claim 1, wherein the positioning notches are spaced apart at regular angular intervals.

4. A gear control device for a motor-vehicle gearbox, the gear control device comprising at least one drum according to claim 1 and at least one stop member, wherein the at least one stop member is arranged to snap-engage in one of the positioning notches depending on a corresponding angular position of the respective drum.

5. The gear control device according to claim 4, wherein the at least one drum comprises two drums each rotatable about a respective rotation axis, and further comprising an actuation unit arranged to bring about rotation of the two drums in a synchronized manner about the respective rotation axes, wherein at least one of the two drums has the positioning notches.

6. The gear control device according to claim 4, wherein the at least one drum comprises two rotary drums each rotatable about a respective rotation axis, and further comprising an actuation unit arranged to bring about rotation of the two drums independently of one another about the respective rotation axes, wherein both drums have the positioning notches.

* * * * *